United States Patent
Choi

(10) Patent No.: US 7,789,796 B2
(45) Date of Patent: Sep. 7, 2010

(54) METHOD FOR CONTROLLING IDLE STOP MODE IN HYBRID ELECTRIC VEHICLE

(75) Inventor: Yong Kak Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 421 days.

(21) Appl. No.: 11/947,032

(22) Filed: Nov. 29, 2007

(65) Prior Publication Data

US 2009/0017985 A1    Jan. 15, 2009

(30) Foreign Application Priority Data

Jul. 13, 2007    (KR)    ............ 10-2007-0070380

(51) Int. Cl.
*B60W 10/06* (2006.01)
(52) U.S. Cl. .................. 477/107; 477/2; 477/10
(58) Field of Classification Search .......... 477/2, 477/101, 107, 110, 111
See application file for complete search history.

(56) References Cited

U.S. PATENT DOCUMENTS

| | | | |
|---|---|---|---|
| 6,913,558 B2 * | 7/2005 | Mori et al. | 477/3 |
| 2002/0142884 A1 * | 10/2002 | Kitajima et al. | 477/2 |
| 2007/0066442 A1 * | 3/2007 | Ido | 477/107 |
| 2008/0146411 A1 * | 6/2008 | Choi | 477/107 |

FOREIGN PATENT DOCUMENTS

| | | |
|---|---|---|
| JP | 2004-132333 | 4/2004 |
| JP | 2005-201107 | 7/2005 |
| KR | 1020050062935 | 6/2005 |

* cited by examiner

*Primary Examiner*—Ha D. Ho
(74) *Attorney, Agent, or Firm*—Morgan, Lewis & Bockius LLP

(57) ABSTRACT

A method for controlling an idle stop mode in a hybrid electric vehicle includes performing an engine RPM lift-up control to raise an engine RPM if a deceleration is less than a medium deceleration when a speed of a hybrid electric vehicle reaches an idle stop mode entering speed such that as the engine RPM is raised, a gear changing oil pressure is increased, so that a continuously variable transmission (CVT) gear ratio according to a deceleration reaches a target minimum gear ratio, and as the CVT gear ratio reaches the target minimum gear ratio, entering an idle stop mode even when a deceleration is less than a medium deceleration while a transmission control unit (TCU) does not perform a control operation for preventing an idle stop mode from being entered.

5 Claims, 4 Drawing Sheets

METHOD FOR CONTROLLING IDLE STOP MODE IN HYBRID ELECTRIC VEHICLE

CROSS-REFERENCE TO RELATED APPLICATION

This application claims the benefit under 35 U.S.C. §119(a) on Korean Patent Application No. 10-2007-0070380 filed on Jul. 13, 2007, the entire contents of which are incorporated herein by reference.

BACKGROUND OF THE INVENTION

1. Field of the Invention

The present invention relates to a method for controlling an idle stop mode in a hybrid electric vehicle, and more particularly, to a method for controlling an idle stop mode in a hybrid electric vehicle in which an idle stop mode is entered when a deceleration of a hybrid electric vehicle is more than a medium deceleration, whereby a fuel consumption ratio is improved.

2. Description of the Related Art

A typical hybrid electric vehicle, as shown in FIG. 1, comprises an inverter 10, a DC/DC converter 20, a high voltage battery 30, a hybrid control unit (HCU) 40, a motor control unit (MCU) 50, a battery management system (BMS) 60, an engine control unit (ECU) 70, a transmission control unit (TCU) 80, a clutch and a continuously variable transmission (CVT) 90, an engine 100, and a motor 200. The engine 100 and the motor 200 are serially connected to each other and serve as a power source for driving a vehicle. The clutch and CVT 90 serve to transfer a power. The inverter 10, the DC/DC converter 20, and the high voltage battery 30 serve to drive the engine 100 and the motor 200. The hybrid control unit (HCU) 40, the motor control unit (MCU) 50, the battery management system (BMS) 60, the engine control unit (ECU) 70, and the transmission control unit 80 serve as means for controlling the above-described components and are connected to communicate with each other through controller area network (CAN) communications.

Functions of the components of the hybrid electric vehicle are described below.

The HCU 40 is an upper-level controller which controls an overall operation of a hybrid electric vehicle. The HCU 40 communicates with the MCU 50, which is a sort of a low-level controller, to control torque, speed and power-generation torque of the motor and communicates with the ECU 70, which controls the engine for generating a power for voltage generation as a power source, to perform an engine starting-related relay control operation and a fault diagnosis operation.

The HCU 40 also communicates with the BMS 60, which manages an overall state of a battery by detecting a temperature, a voltage, an electrical current, a state of charge (SOC) of a battery which is a main power source, to control torque and speed of the motor according to the SOC. The HCU 40 also communicates with the TCU 80, which determines and controls a transmission gear ratio according to a vehicle speed and a demand of a driver, to perform a control operation for maintaining a vehicle speed required by a driver.

The HCU 40 monitors information (accelerator or brake) requested by a driver and current states of the MCU, BMS, ECU, and TCU to control an output voltage of the DC/DC converter so that energy can be efficiently distributed according to a vehicle state. Here, the DC/DC converter 20 serves to have a power to be supplied for a vehicle electrical equipment load and a 12V battery to be efficiently charged.

The high voltage battery 30 is an energy source for driving the motor and the DC/DC converter 20 of the hybrid electric vehicle. The BMS 60 which is a controller of the high voltage battery 30 monitors a voltage, an electrical current and a temperature of the high voltage battery 30 to control the SOC (%) of the high voltage battery 30.

The inverter 10 receives energy from the high voltage battery 30 to supply a three-phase alternating current necessary for driving the motor 200, and the MCU 50 controls the motor 200 under control of the HCU 40.

In connection with control of the DC/DC converter 20, the ECU 70 and the TCU 80 receive an accelerator pedal effort and a brake signal of a driver and provide related information to the HCU 40, which is an upper-level controller, to determine vehicle charging energy.

As an accelerating pedal, i.e., accelerator, a hybrid electric vehicle usually utilizes an electronic throttle control (ETC) type, and when a driver pushes an accelerating pedal, it is converted into a driver requesting torque form, so that torque suitable for a vehicle speed is determined.

That is, the driver requesting torque is set to a mapping value of a vehicle speed for a detecting value of an accelerating pedal, and operating points of the motor, the generator and the engine are determined according to the determined driver requesting torque.

One of main purposes of such a hybrid electric vehicle is to realize a high efficiency vehicle with a high fuel consumption ratio and an eco-friendly vehicle with high emission performance.

In order to achieve the above purpose, a hybrid electric vehicle employs an idle stop mode. Here, the idle stop mode is a mode to stop idling of the engine when a vehicle stops. Due to the idle stop mode, unnecessary idling of the engine is prevented, thereby improving a fuel consumption ratio and emission performance.

When the idle stop mode is triggered to stop the operation of engine, a power of the engine and the motor is transmitted to a vehicle through a transmission, i.e., CVT. Therefore, in order to stably enter the idle stop mode, the clutch, the engine and the motor should be organically controlled.

In order to enter the idle stop mode, the HCU 40 transmits the idle stop mode triggering signal to the ECU 70, the TCU 80 and a full auto temperature control (FATC) (not shown), so that the TCU 80 disengages the clutch to prevent a power of the engine and the motor from being transmitted to a vehicle, and the ECU 70 turns off an engine to prevent a power of the engine from being transmitted.

At this time, the HCU transmits a signal to the MCU 50 to have kill torque to be generated in the motor, so that remaining torque of the engine and the motor is removed, whereby the idle stop mode is completely entered.

However, a conventional hybrid electric vehicle has a problem in that the idle stop mode is not smoothly or stably entered when a deceleration is large (e.g., less than −2 m/sec$^2$), leading to high fuel consumption ratio.

Such a problem is caused by the following reason.

If a deceleration of a hybrid electric vehicle is large (e.g., less than −2 m/sec$^2$), a gear ratio of the CVT does not reach a target minimum gear ratio with a big difference as shown in a graph of FIG. 4, so that the TCU performs a control operation for preventing the idle stop mode from being entered and for having a gear ratio to become a target gear ratio in a state that revolution per minute (RPM) of the engine is secured.

The reason why a gear ratio does not reach a target gear ratio is because if a deceleration is large, large braking torque is required, and so it is difficult to form an oil pressure for changing a gear. For example, it gets delayed to form an oil pressure for suddenly changing a gear ratio from a fourth gear to a first gear. If an oil pressure for changing a gear ratio is not formed, regenerative braking begins during deceleration, so that a gear ratio does not reach a target gear ratio.

If a gear ratio of the CVT does not reach a target gear ratio, the TCU transmits an idle stop mode preventing signal for prohibiting the idle stop mode to the ECU to perform a control operation for obtaining a gear ratio for restart.

Here, if restart is performed in a state that a gear ratio of the CVT does not reach a target gear ratio, a problem such as engine stalling and engine hesitation occurs. For example, it is similar to a phenomenon such as engine stalling and engine hesitation which occur when a manual transmission vehicle starts in a third gear or a fourth gear at a speed of less than 10 kph.

That is, if an actual gear ratio (2.1) of an idle stop mode entering vehicle speed time point does not reach a target minimum gear ratio, the TCU transmits an idle stop mode preventing signal to the ECU to perform a control operation for obtaining a gear ratio for restart.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the aforementioned problems associated with prior arts.

In one aspect, the present invention provides a method for controlling an idle stop mode in which an idle stop mode can be entered even when a deceleration of a vehicle is large, leading to a low fuel consumption ratio. If a deceleration of a vehicle is large, performed is a control operation for having the CVT gear ratio of an idle stop mode entering time point to reach a target gear ratio, so that the TCU does not transmits an idle stop mode preventing signal, and a control operation for reducing the regenerative braking torque according to a deceleration is also performed.

In a preferred embodiment, the present invention provides a method for controlling an idle stop mode in a hybrid electric vehicle, comprising: performing an engine RPM lift-up control to raise an engine RPM if a deceleration is less than a medium deceleration when a speed of a hybrid electric vehicle reaches an idle stop mode entering speed such that as the engine RPM is raised a gear changing oil pressure is increased, so that a continuously variable transmission (CVT) gear ratio according to a deceleration reaches a target minimum gear ratio; and as the CVT gear ratio reaches the target minimum gear ratio, entering an idle stop mode even when a deceleration is less than a medium deceleration while a transmission control unit (TCU) does not perform a control operation for preventing an idle stop mode from being entered.

The step of performing the engine RPM lift-up control to raise the engine RPM comprises in a fuel-on state, at the TCU, asking an engine control unit (ECU) to lift up the engine RPM to thereby raise the engine RPM; and in a fuel-cut state, at the TCU, asking a hybrid control unit (HCU) to lift up the engine RPM, and at the HCU sending a command signal to a motor control unit (MCU) to drive a motor to thereby raise the engine RPM.

When a speed of a hybrid electric vehicle reaches an idle stop mode entering speed and if a deceleration is a medium deceleration, a regenerative braking torque scale control according to a deceleration is performed by the HCU, so that regenerative braking torque is sequentially reduced.

When a speed of a hybrid electric vehicle reaches an idle stop mode entering speed and if a deceleration is a high deceleration, a regenerative braking torque scale control is further performed by the HCU, so that regenerative braking torque becomes zero (0).

When a speed of a hybrid electric vehicle reaches an idle stop mode entering speed and if a deceleration is an abrupt deceleration, control for preventing an idle stop mode from being entered is performed for safety by the HCU and the TCU.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
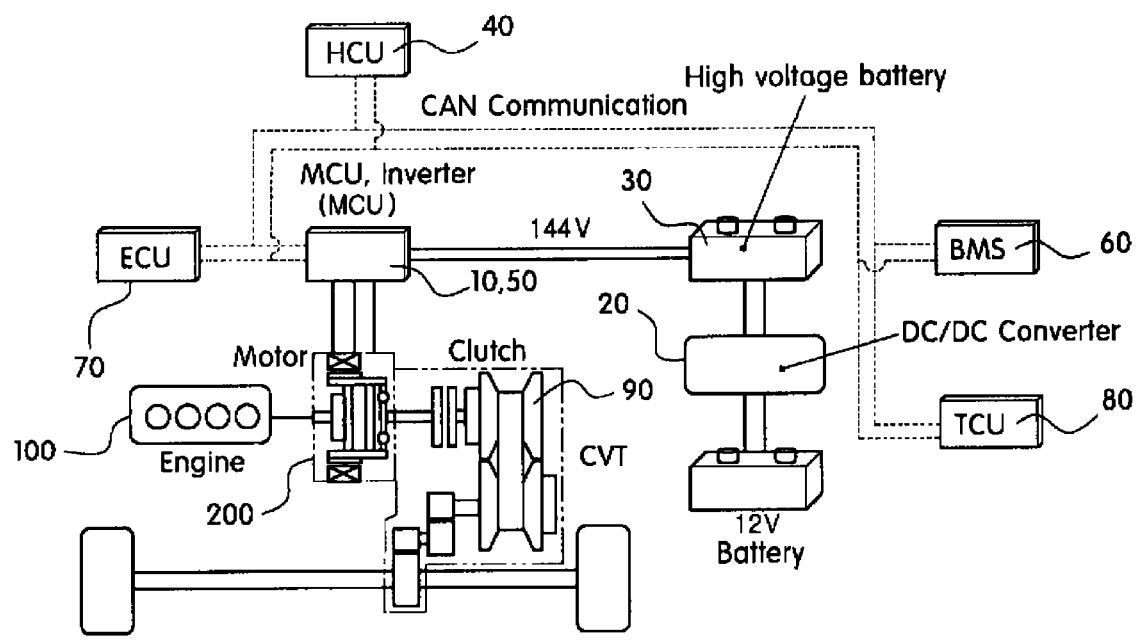
FIG. 1 is a block diagram illustrating a typical hybrid electric vehicle system.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
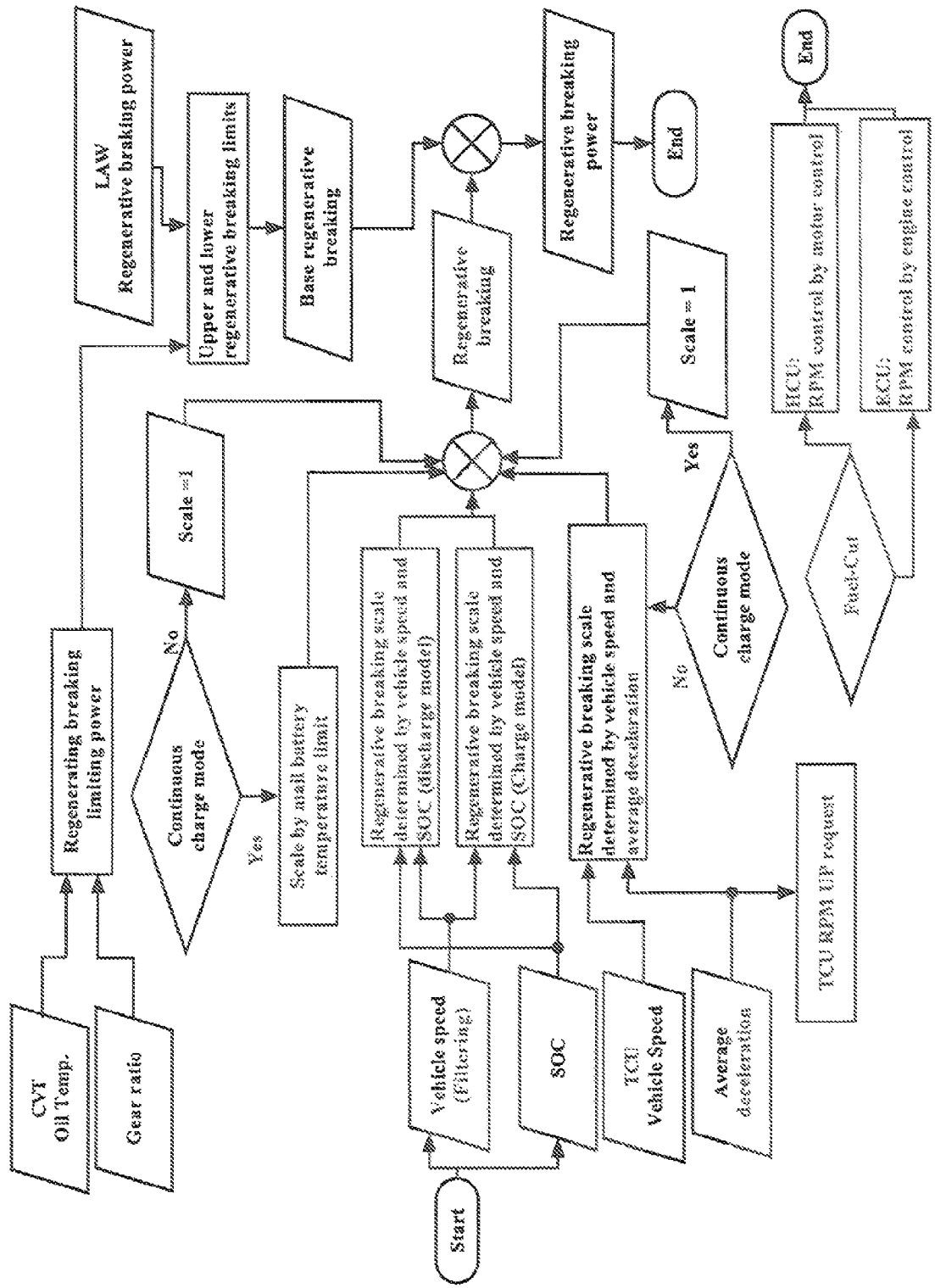
FIG. 2 is a flowchart illustrating a method for controlling an idle stop mode according to an exemplary embodiment of the present invention.
Figure 3:
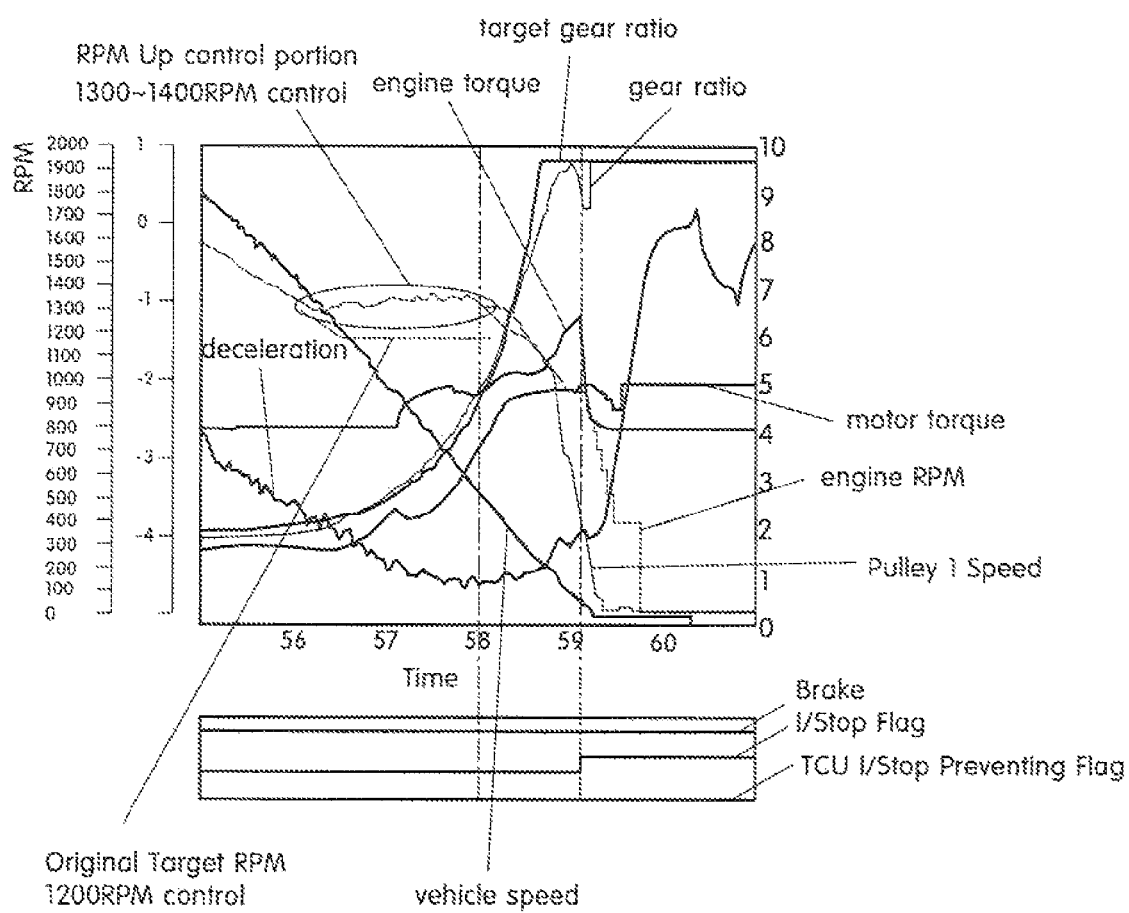
FIG. 3 is a graph illustrating operation profiles of respective parameters depending on a deceleration, which is a result of controlling the idle stop mode of the hybrid electric vehicle according to the exemplary embodiment of the present invention.
Figure 4:
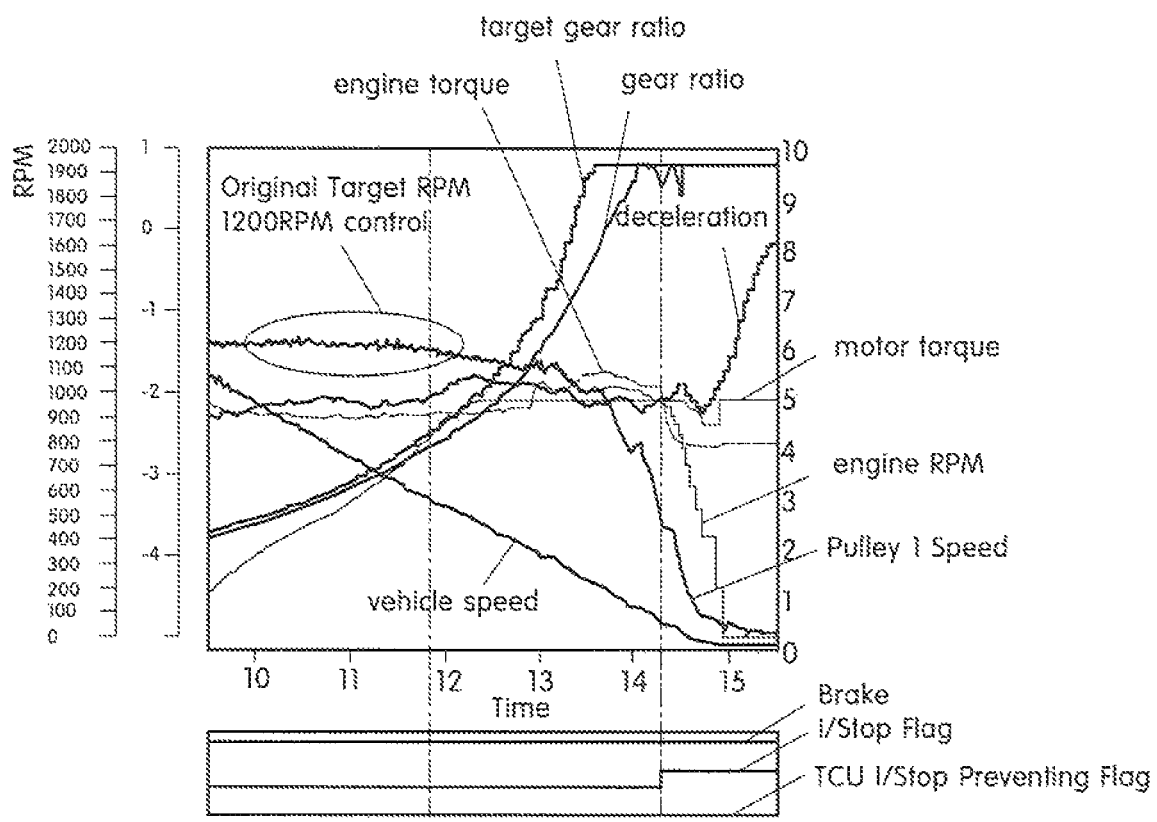
FIG. 4 is a graph illustrating operation profiles of respective parameters depending on a deceleration when the idle stop mode of the hybrid electric vehicle is entered according to a conventional art.

FIG. 2 is a flowchart illustrating a method for controlling an idle stop mode according to an exemplary embodiment of the present invention. FIG. 3 is a graph illustrating operation profiles of respective parameters (gear ratio, engine RPM, engine and motor torque, vehicle speed, an idle stop flag, and an idle stop preventing flag) depending on a deceleration, which is a result of controlling the idle stop mode of a hybrid electric vehicle according to the exemplary embodiment of the present invention.

As described, the idle stop mode is a mode to stop an engine while idling when a vehicle stops in order to improve a fuel consumption ratio. This function may be perfectly performed when an engine, a motor and a CVT are organically controlled.

The idle stop mode is greatly affected by an oil temperature of the CVT, a cooling water temperature of the engine, regenerative braking torque, and a deceleration. In case of a normal deceleration, the idle stop mode is entered while maintaining the drag of the engine after the regenerative braking is completed. At this time, the ECU and the TCU allow the idle stop mode to be entered when a certain idle stop mode entering condition is in a control range.

That is, the ECU controls whether to enter the idle stop mode based on torque learning of the engine and a detecting signal for a cooling water temperature, and the TCU controls whether to enter the idle stop mode based on a detecting signal for an oil temperature and a slip ratio of the CVT and a gear ratio variation.

A typical method for controlling the idle stop mode comprises, at the HCU, transmitting the idle stop mode entering signal to the ECU, the TCU and the FATC, at the TCU, disengaging the clutch to prevent a power of the engine and the motor from being transmitted to a vehicle, and at the ECU, turning off the engine to prevent an engine power from being transmitted.

The present invention does relate to the method for controlling the typical idle stop mode but to a method for controlling the idle stop mode when a deceleration of a hybrid electric vehicle is large (less than $-2$ m/sec$^2$).

In the conventional art, when a deceleration is large, i.e., less than $-2$ m/sec$^2$, a gear ratio of the CVT does not reach a target minimum gear ratio, so that the TCU performs a control operation for preventing the idle stop mode from being entered, whereas according to the present invention, even when a deceleration is large, the CVT gear ratio reaches a target gear ratio, and the regenerative braking torque is reduced depending on a deceleration, so that the idle stop mode can be easily entered, and a fuel consumption ratio is significantly improved.

The method for controlling the idle stop mode when a deceleration of a hybrid electric vehicle is large is described below in detail as one embodiment of the present invention.

When a speed of a hybrid electric vehicle reaches a speed at which the idle stop mode can be entered and if a deceleration is less than $-2$ m/sec$^2$, an engine RPM lift-up control is performed according to whether a fuel supplying state is in a fuel-on state or a fuel-cut state, thereby raising an engine RPM.

If the fuel supplying state is in the fuel-on state, an engine RPM lift-up control is performed such that the TCU asks directly the ECU to lift up an engine RPM, so that an engine RPM is raised from 1200 RPM to 1500 RPM.

On the other hand, if it is in the fuel-cut state, an engine RPM lift-up control is performed such that the TCU asks the HCU to lift up an engine RPM, and thus the HCU controls the MCT to drive the motor to raise an engine RPM.

From this embodiment, as RPM of engine is raised, an oil pressure for changing a gear is increased, so that a gear ratio of the CVT can reach a target gear ratio even when a deceleration is large, i.e., less than 2 m/sec$^2$.

Since a gear ratio of the CVT can reach a target gear ratio even when a deceleration is large, the TCU does not perform a control operation for preventing an idle stop mode from being entered. As a result, even when a deceleration is large, i.e., less than 2 m/sec$^2$, the idle stop mode of a hybrid electric vehicle is entered and unnecessary idling of the engine is prevented, thereby improving a fuel consumption ratio.

As another embodiment of the present invention, a method for controlling regenerative braking torque which is performed together with control of a CVT gear ratio is described below.

According to the present invention, the regenerative braking torque is reduced according to a deceleration by controlling torque of the motor together with a CVT gear ratio, so that the idle stop mode of a hybrid electric vehicle can be easily entered even when a deceleration is large, i.e., less than 2 m/sec$^2$.

In case of a normal deceleration, the idle stop mode is entered while maintaining the engine drag after the regenerative braking is completed, whereas according to the present invention, in case of a large deceleration, the regenerative braking torque is reduced to rapidly trigger the idle stop mode.

Also, when a speed of a hybrid electric vehicle reaches an idle stop mode entering speed and if a deceleration is a medium deceleration of a range of $-2$ m/sec$^2$~$-4.5$ m/sec$^2$, a regenerative braking torque scale control is further performed by the HCU according to a deceleration, so that the regenerative braking torque is sequentially reduced.

The regenerative braking torque scale control according to a deceleration performed by the HCU is a differential control for gradually reducing the regenerative braking torque according to a deceleration of a range of $-2$ m/sec$^2$~$-4.5$ m/sec$^2$. For example, in case of a deceleration of $-2$ m/sec$^2$, the regenerative braking torque is reduced by about 15%, and in case of a deceleration of $-4.5$ m/sec$^2$, the regenerative braking torque is reduced by about 85%, so that the idle stop mode can be rapidly triggered.

Also, when a speed of a hybrid electric vehicle reaches an idle stop mode entering speed and if a deceleration is a high deceleration of a range of $-4.5$ m/sec$^2$~$-5$ m/sec$^2$, the regenerative braking torque becomes zero (0) by the regenerative braking torque scale control performed by the HCU.

Also, when a speed of a hybrid electric vehicle reaches an idle stop mode entering speed and if a deceleration is less than $-5$ m/sec$^2$, it means that a vehicle is in an abrupt deceleration state, which is a very dangerous situation such as an urgent brake, and so the idle stop mode is not entered. To this end, the HCU and the TCU perform a control operation for preventing the idle stop mode from being entered for safety.

As described above, according to the present invention, the idle stop mode is easily entered even when a deceleration of a hybrid electric vehicle is very large by performing a control operation for having a CVT gear of the idle stop mode entering time point to reach a target gear ratio and a control operation for reducing the regenerative braking torque according to a deceleration, thereby improving a fuel consumption ratio.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A method for controlling an idle stop mode in a hybrid electric vehicle, comprising:
    performing an engine RPM lift-up control to raise an engine RPM if a deceleration is less than a medium deceleration when a speed of the hybrid electric vehicle reaches an idle stop mode entering speed such that as the engine RPM is raised, a gear changing oil pressure is increased so that a continuously variable transmission (CVT) gear ratio according to the deceleration reaches a target minimum gear ratio; and
    as the CVT gear ratio reaches the target minimum gear ratio, entering the idle stop mode even when the deceleration is less than the medium deceleration while a transmission control unit (TCU) does not perform a control operation for preventing the idle stop mode from being entered.

2. The method of claim 1, wherein the step of performing the engine RPM lift-up control to raise the engine RPM comprises:
    in a fuel-on state, at the TCU, asking an engine control unit (ECU) to lift up the engine RPM to thereby raise the engine RPM; and
    in a fuel-cut state, at the TCU, asking a hybrid control unit (HCU) to lift up the engine RPM, and at the HCU, sending a command signal to a motor control unit (MCU) to drive a motor to thereby raise the engine RPM.

3. The method of claim 1, wherein when the speed of the hybrid electric vehicle reaches the idle stop mode entering speed and if a deceleration is the medium deceleration, a regenerative braking torque scale control according to the deceleration is performed by the HCU, so that regenerative braking torque is sequentially reduced.

4. The method of claim 1, wherein when the speed of the hybrid electric vehicle reaches the idle stop mode entering speed and if a deceleration is a high deceleration, a regenerative braking torque scale control is further performed by the HCU, so that regenerative braking torque becomes zero (0).

5. The method of claim 1, wherein when the speed of the hybrid electric vehicle reaches the idle stop mode entering speed and if a deceleration is an abrupt deceleration, control for preventing the idle stop mode from being entered is performed for safety by the HCU and the TCU.

* * * * *